United States Patent [19]

Sheridan

[11] 4,248,816

[45] Feb. 3, 1981

[54] PROCESS FOR FORMING SIMULATED MARBLE AND RESULTING PRODUCT

[76] Inventor: James C. Sheridan, 967 Fishburn Dr., Brigham City, Utah 84302

[21] Appl. No.: 828

[22] Filed: Jan. 4, 1979

[51] Int. Cl.[3] .......................... B28B 1/32; B29C 9/00

[52] U.S. Cl. .................................... 264/73; 264/245; 264/255; 428/15; 156/61

[58] Field of Search .................... 428/15; 264/73, 245, 264/254, 255; 156/61

[56] References Cited

U.S. PATENT DOCUMENTS

| | | | |
|---|---|---|---|
| 3,129,110 | 4/1964 | Anderson | 427/421 X |
| 3,219,735 | 11/1965 | Iverson et al. | 428/15 X |
| 3,232,819 | 2/1966 | Satas | 428/227 X |
| 3,328,499 | 6/1967 | Barnette | 428/15 X |
| 3,341,396 | 9/1967 | Iverson | 428/15 X |
| 3,562,379 | 2/1971 | Duggins | 428/15 X |
| 3,773,886 | 11/1973 | Starr et al. | 264/255 X |

*Primary Examiner*—Henry F. Epstein
*Attorney, Agent, or Firm*—Mallinckrodt & Mallinckrodt

[57] ABSTRACT

The process for forming simulated marble disclosed in U.S. Pat. No. 3,773,886 is significantly improved by applying the spatter backing composition sequentially in a plurality of superimposed layers, which are respectively graduated stepwise in surface coverage from about 20% coverage in the first, applied directly over the veining composition, up to a total surface coverage of about 80%, except on vertical or steeply sloping surfaces of articles such as bathroom fixtures where the surface coverage is between about 40% and 50%. This results in a rich and variegated depth of field and a muting of the veining and produces a product that more nearly simulates natural marble than is true of the previously patented process.

8 Claims, 1 Drawing Figure

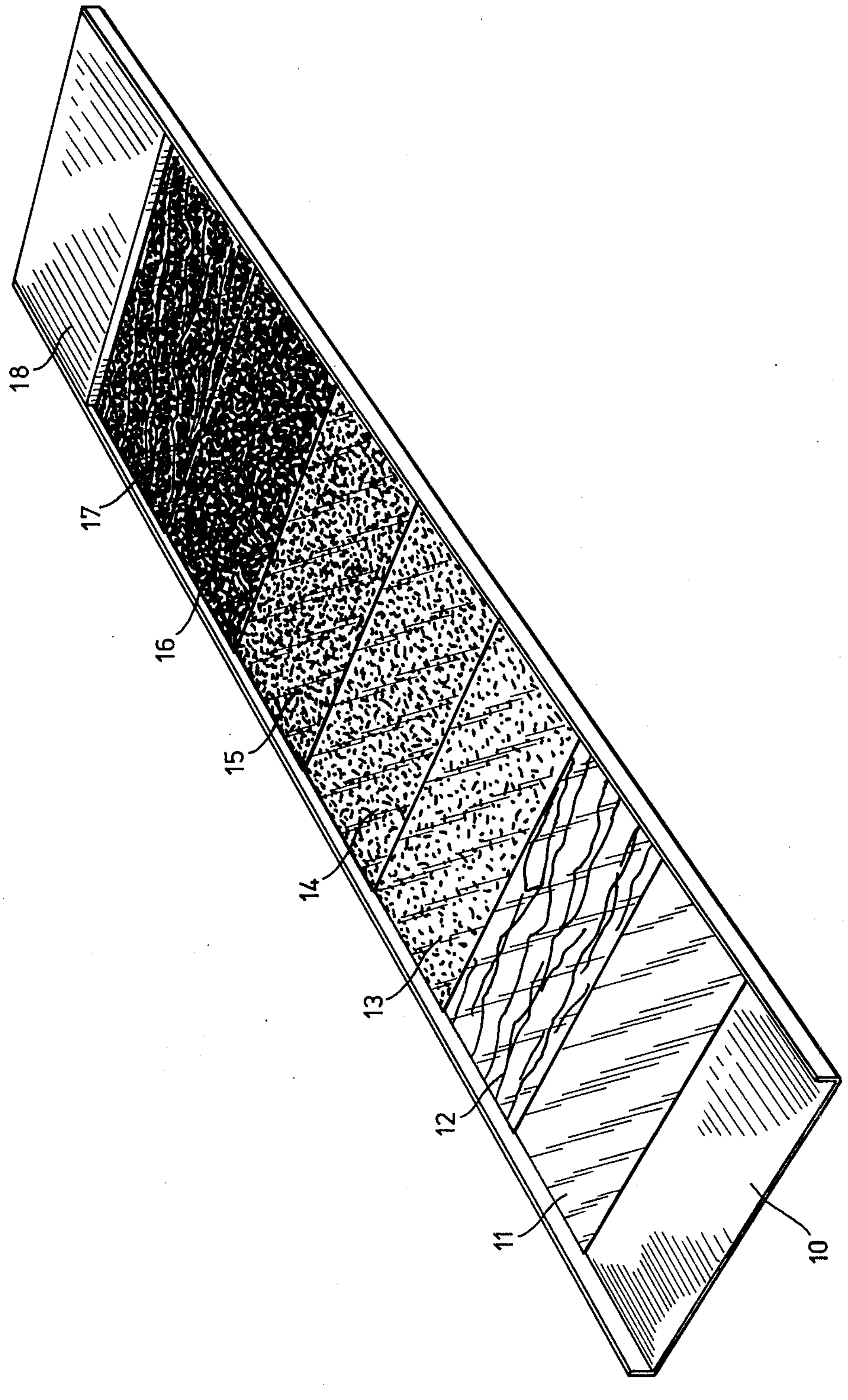
18
17
16
15
14
13
12
11
10

PROCESS FOR FORMING SIMULATED MARBLE AND RESULTING PRODUCT

BACKGROUND OF THE INVENTION

Field: The invention is in the field of processes for the manufacture of simulated or cultured marble in slabs or panels and as surfacing applied to molded articles, such as bathroom fixtures.

State of the Art: Various processes for the production of synthetic or cultured marble have been developed and extensively used commercially in the past. One which has enjoyed particular commercial success is disclosed in detail in U.S. Pat. No. 3,773,886, granted to Fabri-Netics, Ltd. on Nov. 20, 1973, and entitled "Process for Forming Simulated Marble". Briefly, this patented process involves spraying long, coherent streams of a special veining composition on the prepared surface of a mold, spraying a discontinuous coating of a special spatter composition over the thus veined mold surface, and filling the thus-coated mold with a matrix base material. The result has been a superior simulated or cultured marble product, although one still not as realistic as could be desired. The patent indicates that the spatter composition may cover as much as 50% or more of the mold surface, including vertical mold walls. In actual practice, the coverage has been kept at 50% so far as possible.

SUMMARY OF THE INVENTION

In seeking a more truly realistic product, I have found that the spatter composition should be multi-layered to a total coverage, on horizontal surfaces, of about 80% and between about 40% and 50% on vertical or steeply sloping surfaces, the first such layer being widely open between spatters, preferably covering no more than about 20% of the surface area concerned, and successive layers increasing the total surface coverage, stepwise, to the desired maximum. Although as few as two layers of the spatter composition bring about a marked visual improvement in the patented product, it is much preferred to have a total of four layers of such spatter composition, the first covering about 20% of the horizontal mold surface and the others increasing such coverage by about 20% each. Coverage of vertical or sloping surfaces is proportionately less. More than four layers can be used, but are not necessary for satisfactory results and add to production costs.

The individual layers of spatter composition are sprayed on as in the patented disclosure, but with due care exercised as to the quantity applied each time, which quantity cannot be precisely determined but can be reasonably so by observing the apparent coverage. Substantially uniform results can be achieved with practice in the commercial application of the process. Although the successive applications closely follow each other, the time involved in achieving complete application of each layer to most surfaces is long enough to prevent coalescence of subsequently applied material with previously applied material, thereby preserving the open spaces in the respective layers. Since there is some bleeding or chemical reaction of applied materials, there is a limited blending thereof and a muting of the previously applied veining composition that enhances the marble effect and produces a considerably more natural appearance in the final product, especially when the matrix base material is off-white in color, rather than stark white as is customary in commercial applications of the patented process.

It is preferable in the practice of the present invention to make a second application of veining composition following application of the last of the multi-layers of spatter composition. However, if metallic flakes are used in the veining composition to achieve a special effect, the second application of veining composition is made after the first application of the spatter composition, rather than after the last.

The disclosure of aforesaid U.S. Pat. No. 3,773,886 is incorporated herein by reference, especially with respect to the nature and formulations of the several compositions utilized and the manner of applying them to the mold.

THE DRAWING

The single FIGURE of the drawing illustrates a typical embodiment of the invention representing the best mode of carrying it out in actual practice, the view being schematic and showing in perspective how a plurality of layers of spatter composition are applied to a slab-type mold, with dual applications of veining composition, in the previously patented process.

DETAILED DESCRIPTION OF THE ILLUSTRATED EMBODIMENT

As illustrated, a flat slab of simulated or cultured marble having unusually natural appearance is produced by using the materials and general procedures set forth in U.S. Pat. No. 3,773,886 in a flat mold 10 of stainless steel.

The mold surfaces are prepared by the application of a separator or mold-release coating (not indicated) of suitable material, such as the Carnuba wax indicated in the patent. A clear gel coating 11 as specified in the patent is also desirable to provide a glazed facing for the product.

A first application 12 of veining composition as disclosed in the patent is made next in the manner specified in the patent and then a first application of spatter composition as specified in the patent to provide a first layer 13 thereof having about 20% surface coverage, i.e. about 80% voids.

Since the spray application of a spatter composition takes appreciable time, proceeding progressively along the mold area to be covered so that portions of the mold area sprayed first set as other portions are being sprayed, application of successive layers can proceed substantially without interruption (spraying for same being started on the already set portions of the immediately preceding layer) without danger of coalescence of the spatter composition from overlying layer or layers with that of underlying layer or layers. Thus, a second application of spatter composition will follow the first almost immediately to provide a second layer 14 thereof, and then a third and a fourth to provide third and fourth layers 15 and 16, respectively, each of these successive layers, like the first, covering only about 20% of the underlying surface and constituting about 80% voids.

The final, i.e. total, surface coverage of the mold, considering all the layers of spatter composition, is about 80%, leaving about 20% voids extending substantially completely through the multi-layer build-up.

Onto this multi-layered spatter build-up, a second application 17 of veining composition is preferably made prior to slapping generous dabs of matrix base material onto the thus built-up slab front in the providing of a slab backing 18 therefor.

Although the drawing shows how the several applications are built up, one above the others, it should be realized that the final product, finish face down in the mold, is represented by the portions marked 18.

In those instances in which a simulated or cultured marble facing is applied over the surface of one of the parts of a die type of forming mold, as explained in the patent, to produce bathroom fixtures for example, vertical or steeply sloping surfaces of the mold part are coated with multi-layers of spatter composition as previously explained in connection with the production of flat slabs, but leaving about twice the number of voids in each layer, e.g. if four spatter layers are applied, as in the drawing, each will contain about 90% voids and the spatter build-up will cover from about 40% to about 50% of the vertical or steeply sloping mold surface area. Moreover, a gap of approximately three inches is desirably left between the edge margins of the horizontal layers and the edge margins of the vertical or steeply sloping layers to take care of the tendency for the wet spatter composition to migrate downwardly under the influence of gravity.

In the application of the plurality of layers of spatter composition, whether to horizontal or to other surfaces, consideration should be given to covering voids as much as possible, rather than the previously applied spatter, whereby total coverage will be approximately a multiple of the number of layers and coverage by each. Thus, each layer of the spatter composition will largely cover surfaces left uncovered by previously applied layers and there will be voids in the spatter layer build-up whose depths are cumulative.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An improved process for forming simulated or cultured marble in a mold prepared with a mold-release coating, comprising forming a clear polyester gel coat film on said mold, then applying a colored polyester veining composition in a manner simulating the veining of natural marble; successively spattering in random fashion a plurality of layers of a polyester spatter composition over the previously applied veining composition in such manner that each layer of the spatter composition largely covers surface left uncovered by the previously applied layers and that there will be voids in the total spatter build-up; applying a catalyzed polyester matrix composition over the previously applied materials while said veining and said spatter compositions are in a wet state and prior to evaporation skinover of such veining and spatter compositions; curing the applied materials in the mold to provide a final simulated or cultured marble product; and removing said product from the mold.

2. A process in accordance with claim 1, wherein the mold is substantially flat for molding horizontal slabs, and wherein a total of four spatter layers are applied, each layer being about 80% voids so that the spatter build-up covers about 80% of the mold surface area.

3. A process in accordance with claim 1, wherein the mold has steeply sloping mold surfaces as well as substantially horizontal mold surfaces, the spatter build-up on the horizontal mold surfaces covering about 80% of the horizontal mold surface area, and the spatter build-up on the steeply sloping mold surfaces covering from about 40% to about 50% of the steeply sloping mold surface area.

4. A process in accordance with claim 3, wherein relatively narrow gaps of mold surface to which no spatter composition is applied are left between the horizontal mold surfaces and the vertical or steeply sloping mold surfaces.

5. A process in accordance with claim 3, wherein the spatter build-up on both the horizontal mold surfaces and the vertical or steeply sloping mold surface comprises four layers of spatter composition.

6. A process in accordance with claim 1, wherein additional veining composition is applied to the multilayer build-up of spatter composition prior to the application of the matrix composition.

7. A process in accordance with claim 1, wherein the respective layers of the spatter layer build-up contain about the same number of voids.

8. A process in accordance with claim 1, wherein the veining composition contains metallic flakes and additional veining composition is applied over the first layer of spatter composition.

* * * * *